United States Patent
Pan et al.

(10) Patent No.: US 8,520,350 B2
(45) Date of Patent: Aug. 27, 2013

(54) PROTECTION CIRCUIT FOR DIGITAL INTEGRATED CHIP

(75) Inventors: Ya-Jun Pan, Shenzhen (CN); Ting Ge, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 18 days.

(21) Appl. No.: 13/304,628

(22) Filed: Nov. 26, 2011

(65) Prior Publication Data
US 2013/0033792 A1    Feb. 7, 2013

(30) Foreign Application Priority Data
Aug. 2, 2011  (CN) .......................... 2011 1 0219518

(51) Int. Cl.
*H02H 3/20* (2006.01)

(52) U.S. Cl.
USPC ............ 361/91.1; 361/118; 361/91.5; 361/56

(58) Field of Classification Search
USPC .................................. 361/91.1, 56, 91.5, 118
See application file for complete search history.

(56) References Cited

U.S. PATENT DOCUMENTS
2008/0155292 A1*  6/2008  Ren .............................. 713/330

* cited by examiner

*Primary Examiner* — Rexford Barnie
*Assistant Examiner* — Liping Ai
(74) *Attorney, Agent, or Firm* — Altis Law Group, Inc.

(57) ABSTRACT

A protection circuit includes first and second electronic switches. When a CPU socket does not contain a CPU, a signal pin of the CPU socket outputs a high level signal. The first and second electronic switches are turned on. A data transmitting line of a SMBus is connected to a digital integrated chip. The parameters of the digital integrated chip can thus be regulated. When the CPU socket contains the CPU, the signal pin of the CPU socket outputs a low level signal. The first and second electronic switches are turned off. The data transmitting line of the SMBus is disconnected from the digital integrated chip, to prevent damage to the digital integrated chip.

3 Claims, 1 Drawing Sheet

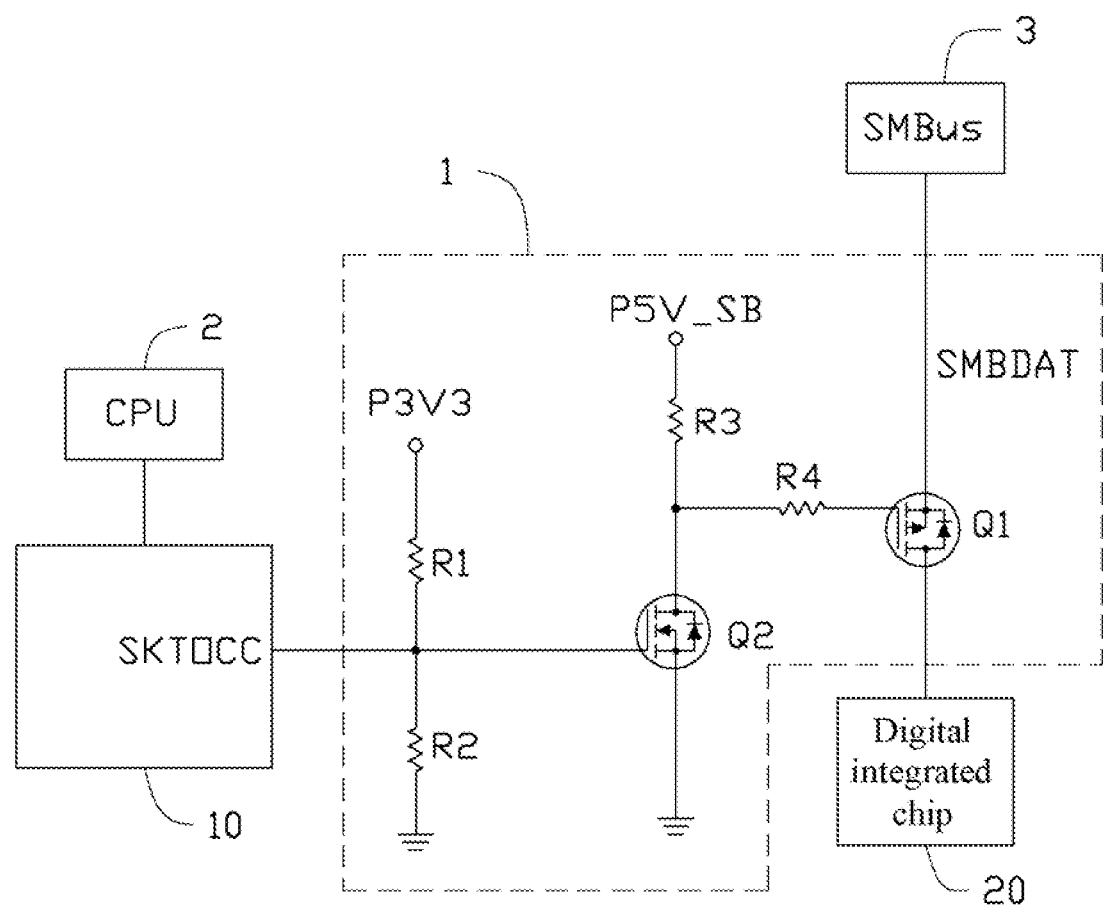

PROTECTION CIRCUIT FOR DIGITAL INTEGRATED CHIP

BACKGROUND

1. Technical Field

The present disclosure relates to a circuit for protecting a digital integrated chip.

2. Description of Related Art

When testing a motherboard, a digital integrated chip arranged on the motherboard is used for controlling the operation of many elements, such as a memory of the motherboard. However, the working parameters of the digital integrated chip should be regulated when a central processing unit (CPU) is not mounted in a CPU socket, otherwise, the digital integrated chip may be damaged.

BRIEF DESCRIPTION OF THE DRAWING

Many aspects of the embodiments can be better understood with parameter to the following drawing. The components in the drawing are not necessarily drawn to scale, the emphasis instead being placed upon clearly illustrating the principles of the present embodiments. Moreover, in the drawing, like numerals designate corresponding parts throughout the several views.

The FIGURE is a circuit diagram of a protection circuit for digital integrated chip in accordance with an exemplary embodiment of the present disclosure.

DETAILED DESCRIPTION

The disclosure, including the drawing, is illustrated by way of example and not by way of limitation. References to "an" or "one" embodiment in this disclosure are not necessarily to the same embodiment, and such references mean at least one.

Referring to the FIGURE, a protection circuit 1 is connected between a central processing unit (CPU) socket 10 and a digital integrated chip 20, to prevent the digital integrated chip 20 from being damaged. The protection circuit 1 in accordance with an exemplary embodiment includes a first electronic switch, such as an n-channel field effect transistor (FET) Q2, a second electronic switch, such as a p-channel FET Q1, and resistors R1-R4. A gate of the FET Q2 is connected to a signal pin SKTOCC of the CPU socket 10, and also connected to a power source P3V3 through the resistor R1. The resistor R2 is connected between the gate of the FET Q2 and ground. A source of the FET Q2 is grounded. A drain of the FET Q2 is connected to a power source P5V_SB through the resistor R3 and also connected to a gate of the FET Q1 through the resistor R4. A drain of the FET Q1 is connected to the digital integrated chip 20. A source of the FET Q1 is connected to a data transmitting line SMBDAT of a system management bus (SMBus) 3. In other embodiments, Q1 may be an npn transistor, and Q2 may be a pnp transistor. The digital integrated chip 20 is a digital pulse width modulation integrated chip.

In use, when the CPU socket 10 does not contain a CPU 2, the signal pin SKTOCC of the CPU socket 10 outputs a high level signal to the FET Q2. The FET Q2 is turned on. The source of the FET Q2 is at a low level. The FET Q1 is turned on. The data transmitting line SMBDAT is connected to the digital integrated chip 20. Thus, the working parameters of the digital integrated chip 20 such as voltage can be regulated through the data transmitting line SMBDAT of the SMBus 3.

When the CPU socket 10 contains the CPU 2, the signal pin SKTOCC of the CPU socket 10 outputs a low level signal. The FET Q2 is turned off. The gate of the FET Q1 receives a high level signal and is turned off. The data transmitting line SMBDAT is disconnected from the digital integrated chip 20. Thus, the parameters of the digital integrated chip 20 cannot be regulated through the data transmitting line SMBDAT of the SMBus 3, and any damage to the digital integrated chip 20 is prevented.

The protection circuit 1 can control the parameters of the digital integrated chip 20 to be regulated according to the high or low level signals of the signal pin SKTOCC of the CPU socket 10, to prevent the digital integrated chip 20 from being damaged.

Even though numerous characteristics and advantages of the disclosure have been set forth in the foregoing description, together with details of the structure and function of the disclosure, the disclosure is illustrative only, and changes may be made in detail, especially in the matters of shape, size, and arrangement of parts within the principles of the disclosure to the full extent indicated by the broad general meaning of the terms in which the appended claims are expressed.

What is claimed is:

1. A protection circuit is connected between a central processing unit (CPU) socket and a digital integrated chip, to prevent the digital integrated chip from being damaged when a CPU is mounted in the CPU socket, wherein the CPU socket comprising a signal pin, the protection circuit comprising:
   first to fourth resistors;
   a first electronic switch comprising first to third terminals, wherein the first terminal of the first electronic switch is connected to the signal pin of the CPU socket, connected to a first power source through the first resistor, and grounded through the second resistor, the second terminal of the first electronic switch is grounded, the third terminal of the first electronic switch is connected to a second power source through the third resistor; and
   a second electronic switch comprising first to third terminals, the first terminal of the second electronic switch is connected to the third terminal of the first electronic switch through the fourth resistor, the second terminal of the second electronic switch is connected to the digital integrated chip, the third terminal of the second electronic switch is connected to a data transmitting line of a system management bus (SMBus);
   wherein when the CPU socket does not contain a CPU, the signal pin of the CPU socket outputs a high level signal, the first and second electronic switches are turned on, the data transmitting line of the SMBus is connected to the digital integrated chip, the working parameters of the digital integrated chip can be regulated, when the CPU socket contains the CPU, the signal pin of the CPU socket outputs a low level signal, the first and second electronic switches are turned off, the data transmitting line of the SMBus is disconnected from the digital integrated chip, to prevent damage to the digital integrated chip.

2. The protection circuit of claim 1, wherein the first electronic switch is an n-channel field effect transistor (FET), the first, second, and third terminals of the electronic switch are a gate, a source, and a drain of the FET, and the second electronic switch is a p-channel field effect transistor (FET), the first, second, and third terminals of the second electronic switch are a gate, a drain, and a source of the FET.

3. The protection circuit of claim 1, wherein the digital integrated chip is a digital pulse width modulation integrated chip.

* * * * *